Figure 1:
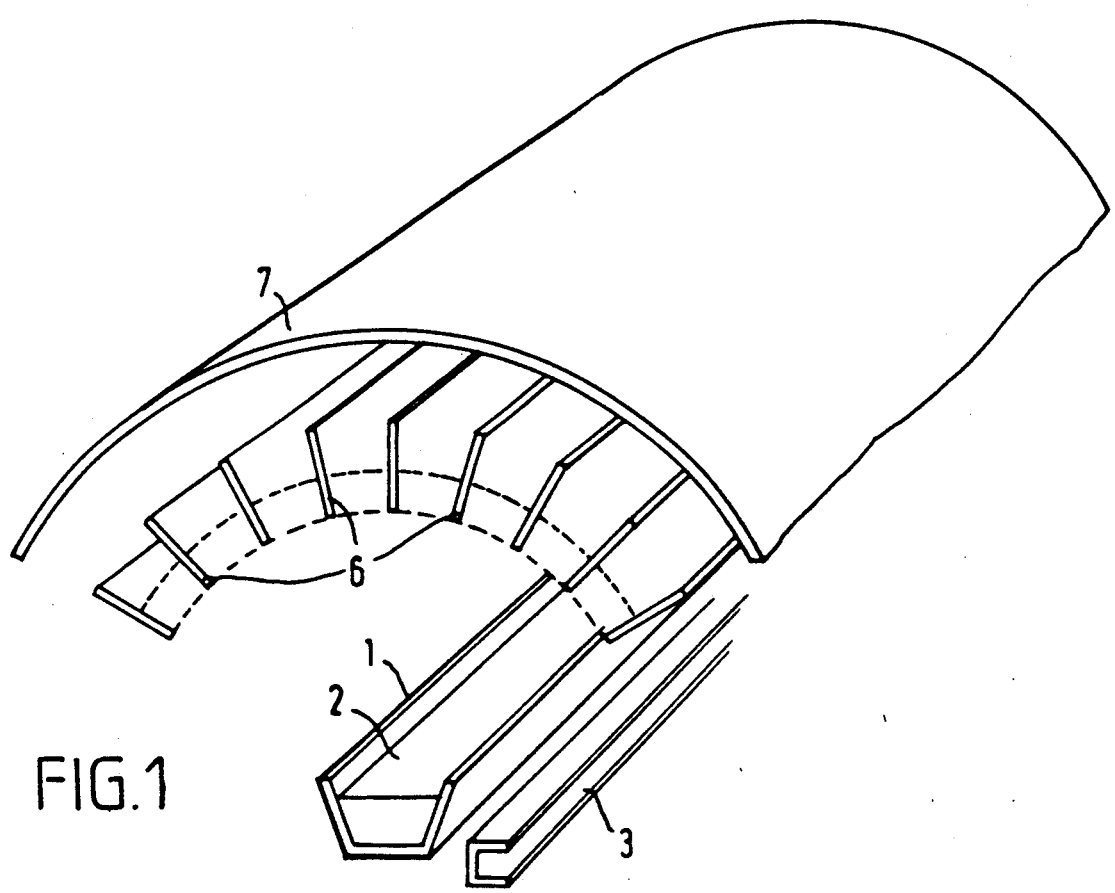

United States Patent [19]

Cordfunke et al.

[11] Patent Number: 5,025,152

[45] Date of Patent: Jun. 18, 1991

[54] APPARATUS FOR SEPARATING ISOTOPES OF URANIUM

[75] Inventors: Erik H. P. Cordfunke, Schoorl; Cornelis J. J. Tool, Wognum, both of Netherlands

[73] Assignee: Ultra-Centrifuge Nederland N.V., Almelo, Netherlands

[21] Appl. No.: 306,899

[22] Filed: Feb. 7, 1989

[30] Foreign Application Priority Data

Feb. 10, 1988 [NL] Netherlands ............... 8800327

[51] Int. Cl.⁵ .................. B01D 59/50; B01D 59/34
[52] U.S. Cl. ..................... 250/281; 204/157.22; 250/283; 250/284
[58] Field of Search ........... 204/157.22, 157.2, 157.21; 250/423 P, 281, 283, 284

[56] References Cited

U.S. PATENT DOCUMENTS

| 3,772,519 | 11/1973 | Levy et al. | 204/157.22 X |
|---|---|---|---|
| 3,944,825 | 3/1976 | Levy et al. | 250/283 |
| 3,959,649 | 5/1976 | Forsen | 204/157.22 X |
| 3,985,551 | 10/1976 | Powell et al. | 252/636 |
| 4,028,096 | 6/1977 | Banker et al. | |
| 4,031,389 | 6/1977 | Russell et al. | 250/281 |
| 4,070,580 | 1/1978 | Gallagher et al. | 250/284 |
| 4,087,573 | 5/1978 | Holcombe et al. | 423/263 |
| 4,107,524 | 8/1978 | Book | 250/283 |
| 4,148,663 | 4/1979 | Holcombe | 106/105 |
| 4,155,008 | 5/1979 | Jones et al. | 250/281 |
| 4,210,814 | 7/1980 | Clifford | 250/423 P X |
| 4,286,152 | 8/1981 | Pugh et al. | 250/281 |
| 4,786,478 | 11/1988 | Ahmed et al. | 204/157.22 |

OTHER PUBLICATIONS

Chemical Abstracts, vol. 92, 1980, p. 286, abs.#92:26725q.

Primary Examiner—Edward A. Miller

[57] ABSTRACT

An apparatus for separating isotopes of uranium, comprising a vacuum chamber and a source of uranium placed therein, means for evaporating uranium from the source, means for selectively ionizing a selected isotope from resultant uranium vapor, means for applying an electric and/or magnetic field within the chamber and a set of collector plates for collecting uranium ions and at least a collector plate for collecting un-ionized uranium, said ion-collecting plates consisting, at least at the collecting surface, of sintered yttrium oxide made electrically conductive by doping.

6 Claims, 1 Drawing Sheet

APPARATUS FOR SEPARATING ISOTOPES OF URANIUM

This invention relates to an apparatus for separating isotopes of uranium, comprising a vacuum chamber, a source of uranium placed within said chamber, means for selectively ionizing a selected isotope in the uranium vapor, means for applying an electric and/or a magnetic field in the vacuum chamber, as well as a set of collector plates for collecting the uranium ions and one or more collector plates for collecting un-ionized uranium atoms.

Such an apparatus is known from Dutch patent application 74 16934. Such an apparatus is also known from U.S. Pat. No. 4,210,814, which publication is considered inserted herein by way of reference. In the prior apparatus the uranium to be evaporated, which contains both U-235 isotope and U-238 isotope, is placed within a suitable crucible. A source of electrons provided beside the crucible, e.g., a heated filament, delivers an electron beam deflected by a suitable magnetic field and directed to the surface of the uranium in the crucible. Thus a uranium vapor is created which expands radially from the source of uranium. By means of a suitably adjusted laser beam directed to the uranium vapor, atoms of the U-235 isotope are selectively ionized, while the atoms of the other isotope remain unchanged. By applying an electric and/or magnetic field the ions moving radially outward are deflected, while the neutral atoms continue to move radially. The collector plates for the ions are radially provided, so that only deflected ions can contact the plates and the neutral atoms move along the plates in a direction parallel to them. The collector plates for the neutral atoms are provided, seen in the direction of movement of the atoms, beyond the collector plates for the ions and are substantially directed transversely to the direction of movement of the atoms.

The prior apparatus is operated to deposit the ions and the atoms as solid particles onto the respective collector plates. The collector plates for the ions must have a certain degree of electrical conductivity in order to remove the charge supplied by the ions. The above publication is silent as to the material of the collector plates. In another publication, U.S. Pat. No. 3,772,519, it is stated with respect to a similar apparatus that the collector plates are of stainless steel.

In the prior apparatus the uranium isotopes are deposited as solid particles onto the collector plates, so that it is not easy to remove the collected material. It would be easier if the uranium isotopes could be condensed on the collector plates. If the uranium is and remains liquid, it can be removed from the collector plates more easily, e.g., by dripping it from these plates and collecting it in suitable collecting vessels. The uranium can be kept liquid by applying a temperature higher than is conventional in the prior apparatus. The problem involved is, however, that in that case the collector plates must consist of a material resistant to such high temperatures and to liquid uranium. Besides, the collector plates, in any case the plates for collecting the selectively ionized uranium, must have an acceptable electrical conductivity.

The object of this invention is to provide an apparatus for separating uranium isotopes in which the problem described has been solved, so that the apparatus is operable at temperatures so high that the uranium can be collected and removed in a liquid state.

The object aimed at is accomplished according to this invention with an apparatus in which the collector plates for the ions consist, at least at the collecting surface, of sintered yttrium oxide made electrically conductive by suitable doping.

It has been found that collector plates consisting in full or in part of sintered yttrium oxide are resistant to liquid uranium. Yttrium oxide is, however, an electrically nonconductive material. It is therefore not useful as a material for a collector plate for ions. Suitable doping of the yttrium oxide, however, can make it conductive, so that it will be useful. Doping must then be such that the resistance to liquid uranium is retained. This is the case with a preferred embodiment of the apparatus according to the present invention, in which the yttrium oxide of the collector plates is doped with uranium oxide. Furthermore, the uranium oxide is preferably doped to such an extent that it contains 5-10 wt.% uranium oxide.

In order that the material of the collector plates be optimally resistant to the high temperatures and aggressive materials to be used in the apparatus, it is advisable that the density of the sintered yttrium oxide exceed 90% of the theoretical density. Preferably, that density is at least 97% of the theoretical density.

Excellent results are obtainable if the collector plates consist at least partly of sintered yttrium oxide prepared using sintering-active yttrium oxide powder having a particle size below 1 micrometer.

It should further be noted that the process of sintering yttrium oxide is known per se. Publications on that subject were issued in, e.g., Ceramics International, Vol. 9, 1983, No. 2, pages 59-60 and ditto No. 2, pages 87-92, and Vol. 10, No. 3, 1984, pages 99-104.

Figure 2:
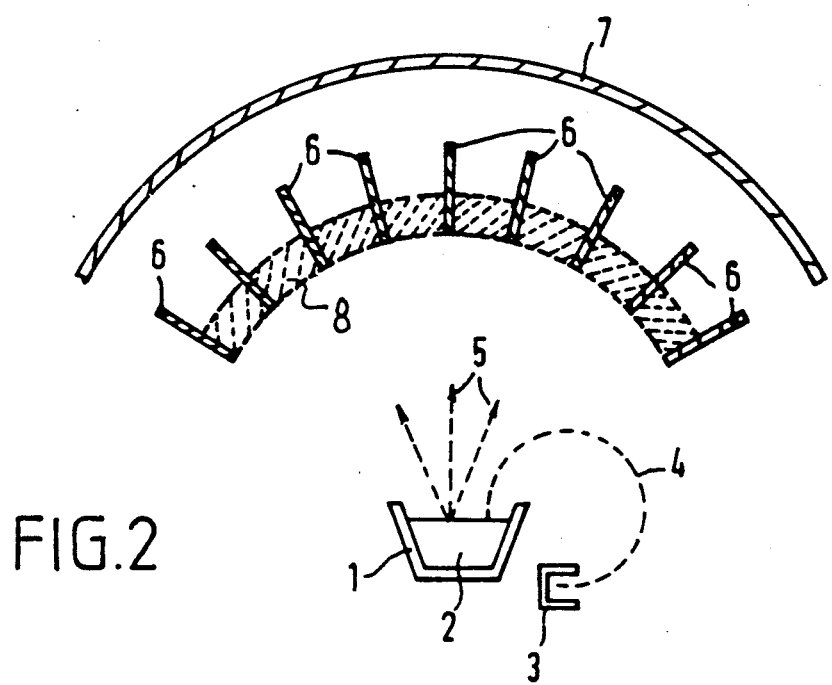

This invention will now be illustrated by way of example with reference to the accompanying drawing of which:

FIG. 1 is a diagrammatic perspective view of a number of parts of an embodiment of the apparatus according to this invention, and FIG. 2 is a cross-sectional view of these parts.

The figures show only a few important parts of an embodiment of the apparatus according to this invention. The vacuum chamber within which these parts are placed is not shown. The different electric lines from and to the different parts and the feeders for applying the desired electric and/or magnetic fields are not shown either. Their construction is known to a person skilled in the art and is already described in other publications, e.g., in the aforementioned Dutch patent application 74 16934.

In the apparatus according to FIGS. 1 and 2 there is provided an elongate crucible 1 of a suitable material, e.g. yttrium oxide. During operation the crucible 1 contains the mass 2 of, e.g., natural uranium. The natural uranium consists, as is known, to a greater degree of the U-238 isotope and to a lesser degree of the U-235 isotope. The U-238 and U-235 isotopes are to be separated from each other. In the apparatus according to the invention this is done as follows. From the linear source of electrons 3 of known construction, the feeder of which source 3 is not shown, electrons are directed to the mass 2. In FIG. 2 the electron beam is represented by the broken line 4. Uranium atoms are evaporated from the mass 2 by the electron beam 4. These uranium atoms are electrically neutral and move in a straight line from the surface of the mass 2 radially outward, as shown in FIG. 2 by the arrows 5 drawn in broken lines.

The uranium atoms 5 move radially outward and pass through the area in which a set of collector plates 6 is provided, the main surface of each of said plates extending radially, therefore parallel to the direction of movement of the uranium atoms. In the area of the set of collector plates 6 a laser beam is directed to the uranium vapor. The laser beam is operative in a part of an annular strip, which is diagrammatically shown in FIG. 2 by the hatched area 8 indicated by broken lines. The laser beam produces a frequency such that one of the uranium isotopes, namely U-235, is thereby selectively ionized, while the atoms of the other isotope remain unchanged. By applying suitable magnetic fields and/or electric fields the resultant uranium ions are deflected from their radial straight-line path, so that they contact one of the collector plates 6 and are deposited thereon. The neutral U-238 atoms move between the collector plates 6 and finally contact the bent collector plate 7 which is placed transversely to their path.

If the temperature in the apparatus is kept so high that the uranium is liquid, the uranium ions on the plates 6 and the uranium atoms on the plate 7 will be formed to droplets on these respective collectors and the thus separated isotopes will be continuously removable by dripping the liquid uranium from the plates. On the other hand, even if the amount of collected uranium is too small to be drained, the liquid material can be removed more easily than would be the case if the particles were deposited on the collectors in solid form.

Since ions are deposited on the collector plates 6, these plates 6 must be electrically conductive at least to such a degree that the charge supplied by the ions can be removed, so that the ions are neutralized to atoms. Besides, the plates 6 and 7 must be resistant to the liquid uranium.

The present apparatus meets these requirement in that the collector plates 6 and optionally also 7 consist, at least at the collecting surface, of yttrium oxide ($Y_2O_3$) made electrically conductive. The plate material is then formed, e.g., by sintering suitable sintering-active yttrium oxide powder and electrical conductivity is provided by suitable doping, e.g., with uranium oxide. It has been found that acceptable doping can be obtained, e.g., with 5–10 wt.% uranium oxide.

The collector plates 6 and optionally 7 must consist of sintered doped yttrium oxide, at least at the collecting surface. Parts of a plate that do not contact uranium could be made of another suitable material. For example, the core of a plate may be made of any suitable refractory ceramic material and a coating of the material according to the invention may be present on that core.

Suitably, the material of the collector plates is as dense as possible, so that no mechanical stresses occur owing to after-sintering. A density of at least 90% and preferably more than 97% of the theoretical density has proved to be useful. A high density can be achieved in the production by starting from sintering-active yttrium-oxide powder having a relatively low particle size, e.g., below 1 micrometer.

We claim

1. An apparatus for separating isotopes of uranium, comprising a vacuum chamber, a source of uranium placed within said chamber, means for evaporating uranium from the uranium source, means for selectively ionizing a selected isotope in the uranium vapor, means for applying an electric and/or a magnetic field in the vacuum chamber, as well as a set of collector plates for collecting the uranium ions and one or more collector plates for collecting un-ionized uranium atoms, the improvement comprising that the collector plates for the ions consist, at least at the collecting surface, of sintered yttrium oxide made electrically conductive by suitable doping.

2. An apparatus according to claim 1, characterized in that the yttrium oxide of the collector plates is doped with uranium oxide.

3. An apparatus according to claim 2, characterized in that the yttrium oxide of the collector plates is doped with 5–10 wt.% uranium oxide.

4. An apparatus according to claims 1, characterized in that the density of the sintered yttrium oxide exceeds 90% of the theoretical density.

5. An apparatus according to claim 4, characterized in that the density is at least 97% of the theoretical density.

6. An apparatus according to claim 1, characterized in that the sintered yttrium oxide is prepared using sintering-active yttrium oxide powder having a particle size below 1 micrometer.

* * * * *